US009704262B2

United States Patent
Baloch et al.

(10) Patent No.: US 9,704,262 B2
(45) Date of Patent: Jul. 11, 2017

(54) PARAMETER ESTIMATION FOR MESH SEGMENTATION USING RANDOM WALKS

(71) Applicant: Siemens Aktiengesellschaft, Munich (DE)

(72) Inventors: Sajjad Hussain Baloch, Novi, MI (US); Eleni Siampli, Munich (DE); Leo Grady, Millbrae, CA (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/892,117

(22) PCT Filed: May 21, 2014

(86) PCT No.: PCT/US2014/038941
§ 371 (c)(1),
(2) Date: Nov. 18, 2015

(87) PCT Pub. No.: WO2014/190037
PCT Pub. Date: Nov. 27, 2014

(65) Prior Publication Data
US 2017/0004627 A1 Jan. 5, 2017

Related U.S. Application Data

(60) Provisional application No. 61/826,059, filed on May 22, 2013.

(51) Int. Cl.
*G06K 9/00* (2006.01)
*G06T 7/12* (2017.01)
(Continued)

(52) U.S. Cl.
CPC ............... *G06T 7/12* (2017.01); *G06T 7/11* (2017.01); *G06T 7/143* (2017.01); *G06T 7/162* (2017.01);
(Continued)

(58) Field of Classification Search
CPC ... G06T 7/0032; G06T 7/0051; G06T 7/0012; G06T 2207/10028; G06T 2207/10072;
(Continued)

(56) References Cited

U.S. PATENT DOCUMENTS

2009/0324041 A1* 12/2009 Narayanan ......... G06K 9/00986
382/131
2010/0215235 A1* 8/2010 Yoon ................... G06K 9/00369
382/131

(Continued)

OTHER PUBLICATIONS

PCT International Search Report mailed Aug. 20, 2014 corresponding to PCT International Application No. PCT/US2014/038941 filed May 21, 2014 (13 pages).
D.D. Hoffman University of California, Irvine, W.A. Richards Massachusetts Institute of Technology "Parts of Recognition" Cognition, 18 (1984) 65-96.
(Continued)

*Primary Examiner* — Ali Bayat

(57) ABSTRACT

A method for segmenting mesh models in digital images includes providing (11) a mesh surface model (V, F, E) of a shape embedded in a 3-dimensional space, providing (12) a ground truth segmentation of the mesh surface model, constructing (13) a feature vector $v_i$ composed of underlying geometric properties of the mesh at each vertex point, using (14) the ground truth segmentation and the feature vectors to determine weights $w_{ij}$ for edges $e_{ij}$ where the weights $w_{ij}$ are the probabilities of a random walker crossing edges $e_{ij}$ between vertices $v_i$ and $v_j$ in a random walker segmentation initialized with at least two seeds of different labels.

22 Claims, 11 Drawing Sheets

(51) Int. Cl.
*G06T 17/20* (2006.01)
*G06T 7/11* (2017.01)
*G06T 7/143* (2017.01)
*G06T 7/162* (2017.01)

(52) U.S. Cl.
CPC .... *G06T 17/20* (2013.01); *G06T 2207/20072* (2013.01); *G06T 2207/20076* (2013.01)

(58) Field of Classification Search
CPC . G06T 2207/30004; G06T 2207/30196; G06T 2207/10012
See application file for complete search history.

(56) References Cited

U.S. PATENT DOCUMENTS

| | | | | |
|---|---|---|---|---|
| 2010/0240996 | A1* | 9/2010 | Ionasec | G06T 7/0016 600/443 |
| 2014/0294247 | A1* | 10/2014 | Sirault | G06K 9/00 382/110 |
| 2015/0206341 | A1* | 7/2015 | Loper | G06T 17/10 345/420 |

OTHER PUBLICATIONS

Zhongping Ji, Lipang Liu, Zhonggui Chen, and Guojin Wang "Easy Mesh Cutting" vol. 25 (2006) No. 3.

Juyong Zhang, Chunlin Wu, Jianfei Cai, Jianmin Zheng, Xue-Cheng Tai, Nanyang Technological University, Singapore ,"Mesh Snapping: Robust Interactive Mesh Cutting Using Fast Geodesic Curvature Flow" vol. 29 (2010) No. 2.

Juyong Zhang et al: Interactive Mesh Cutting Using Constrained Random Walks, IEEE Transactions on Visualization and Computer Graphics, IEEE Service Center, Los Alamitos, CA, US, vol. 17, No. 3, Mar. 1, 2011, pp. 357-367, XP011341469; 2011.

"A Benchmark for 3D Mesh Segmentation" Xiaobai Chen, Aleksey Golovinskiy, Thomas Funkhouser, Princeton University.

Sun X et al: "Random walks for feature-preserving mesh denoising", Computer Aided Geometric Design, North Holland, Amsterdam, NL, vol. 25, No. 7, Oct. 1, 2008, pp. 437-456, XP024338556; 2008.

Yu-Kun Lai, Shi-Min Hu, et al: "Fast Mesh Segmentation Using Random Walks" Proceedings of the 2008 ACM Symposium on Solid and Physical Modeling, SPM '08, Jun. 2, 2008, p. 183, XP055132727; 2008.

Xianfang Sun, Paul L. Rosin, Ralph R. Martin, Frank C. Langbein; "Random Walks for Mesh Denoising".

* cited by examiner

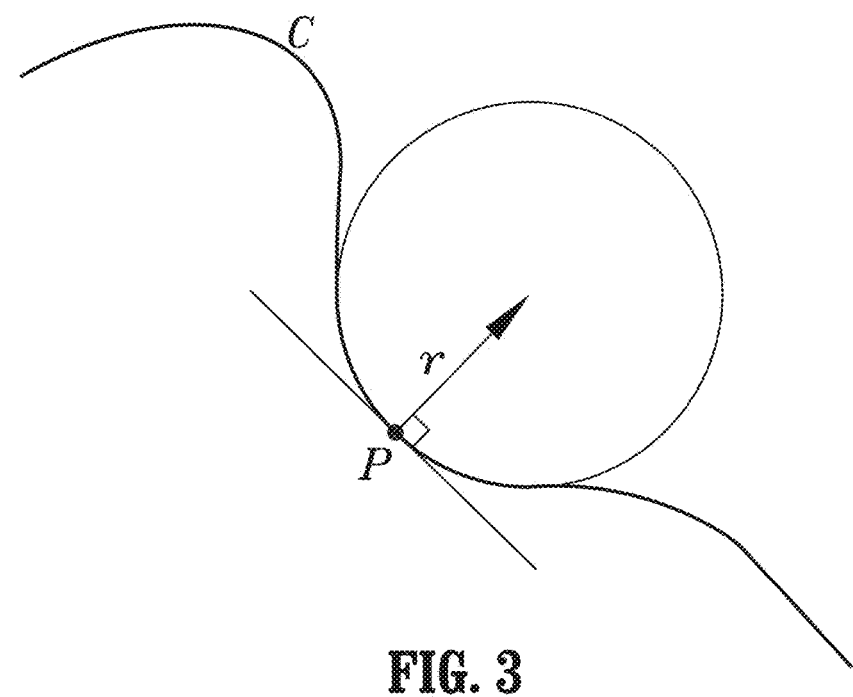
FIG. 3
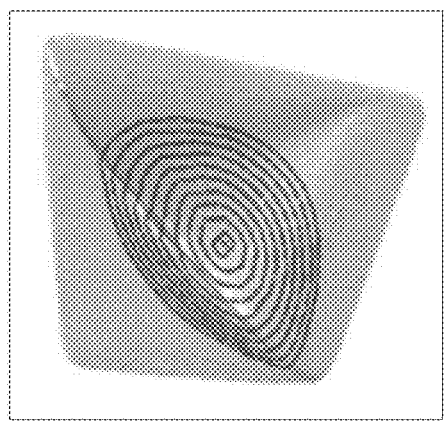 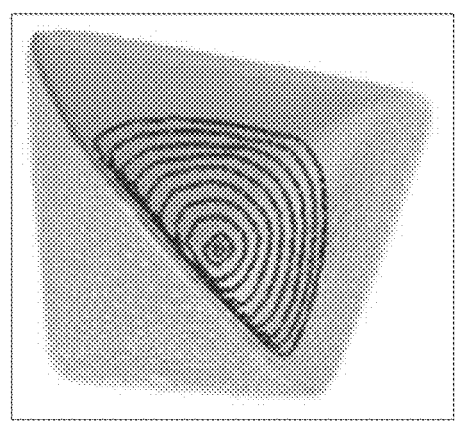
FIG. 4(a)   FIG. 4(b)

|  | Interactive Mesh Constrained Random Walks | Fast Mesh Segmentation using Random Walks | Random Walks for Mesh Denoising | Easy Mesh Cutting | Robust Interactive Mesh Cutting using Fast Geodesic Curvature Flow |
|---|---|---|---|---|---|
| Tp(TruePositive) | 25824.000000 | 27378.000000 | 27881.000000 | 28277.000000 | 27480.000000 |
| Tn(TrueNegative) | 13978.000000 | 13726.000000 | 12875.000000 | 12383.000000 | 13703.000000 |
| Fp(FalsePositive) | 169.000000 | 421.000000 | 1272.000000 | 1764.000000 | 444.000000 |
| Fn(FalseNegative) | 2983.000000 | 1429.000000 | 926.000000 | 530.000000 | 1327.000000 |
| Sensitivity | 0.896449 | 0.950394 | 0.967855 | 0.981602 | 0.953935 |
| Specificity | 0.988054 | 0.970241 | 0.910087 | 0.875309 | 0.968615 |
| Accuracy | 0.926619 | 0.956931 | 0.948829 | 0.946594 | 0.958770 |
| OverlapRatio | 0.942482 | 0.967318 | 0.962077 | 0.961018 | 0.968782 |

Table 1

| | Interactive Mesh Constrained Random Walks | Easy Mesh Cutting | Robust Interactive Mesh Cutting using Fast Geodesic Curvature Flow |
|---|---|---|---|
| 1st parameter | 0.2454 | 0.21807 | 1.2070 |
| 2nd parameter | 0.4669 | 5.0 | 4.9551 |
| Tp(TruePositive) | 43379.000000 | 23798.000000 | 43466.000000 |
| Tn(TrueNegative) | 34290.000000 | 26819.000000 | 35598.000000 |
| Fp(FalsePositive) | 4546.000000 | 932.000000 | 3238.000000 |
| Fn(FalseNegative) | 733.000000 | 2306.000000 | 646.000000 |
| Sensitivity | 0.983383 | 0.911661 | 0.985355 |
| Specificity | 0.882944 | 0.966416 | 0.916624 |
| Accuracy | 0.936358 | 0.939876 | 0.953175 |
| OverlapRatio | 0.942643 | 0.936302 | 0.957232 |

Table 2

PARAMETER ESTIMATION FOR MESH SEGMENTATION USING RANDOM WALKS

CROSS REFERENCE TO RELATED UNITED STATES APPLICATIONS

This application claims priority from "Interactive Mesh Segmentation Using Random Walks", U.S. Provisional Application No. 61/826,059 of Baloch, et al., filed on May 22, 2013, the contents of which are herein incorporated by reference in their entirety.

TECHNICAL FIELD

Embodiments of the present disclosure are directed to a methods and systems for segmentation of digital images.

Discussion of the Related Art

Mesh segmentation has applications in many different fields in medicine and engineering and more specifically in reverse engineering and modeling. There are many methods of mesh segmentation, many of which are time consuming. These methods are typically defined by a small number of parameters, which are set by determining which values yield better results.

Modeling is the process of developing a mathematical representation of a 3-dimensional (3D) surface of object via 3D computer graphics software. The modeling result of 3D represents an object, which is a collection of points in 3D space. These points may be retrieved by scanning the objects and are connected by various entities, such as triangles, lines, quads or polygons. This disclosure concerns primarily boundary 3D models, in which only boundary/surface information is known. In particular, this disclosure concerns general 3D polygonal Mesh Models with points, lines and polygons, even though for simplicity it occasionally refers to triangular meshes.

Mesh segmentation is the partitioning and division of a 3D mesh model into meaningful regions. In 3D mesh segmentation, Hoffmann's observation, known as minima rule, is the basis of the segmentation. The minima rule states that human vision tends to define regions of minimum curvature, i.e. concave and convex areas that separate object parts. This rule helps to extract features to find useful contours, which are referred to as the segmentation boundaries in the sense that they decompose a mesh into various meaningful regions. Various tests have shown that humans take more notice of discontinuities on a shape outline than to the coherency of different shape parts. This is useful in that it enables one to define a feature value on each point by the minima rule.

Interactive segmentation, a popular technique in computer graphics, involves prompting a user to select some points on a mesh to help how to define a meaningful part from a given triangulated mesh. This procedure includes three categories:

1. The user is asked to specify a few points on a desired segmentation contour.
2. The user is asked to specify a few points close to a segmentation contour, and the algorithm then does the local refinement. Methods to do this include: a geometric snake graph cut, mesh scissoring and intelligent scissoring.
3. The user selects points that are in the desired part of segmented areas. The combination of user input and a random walk algorithm, described next, gives good results, even with an imprecise selection of the initial points.

One method for mesh segmentation that is efficient, easy to implement and robust to noise is the random walk algorithm. The basic idea of this method in image segmentation is that pixels or voxels (2-dimensions (2D) or 3D respectively) are represented as a graph G<V,E>, where V(nodes) are the pixels/voxels and E(edges) are the edges that connect the pixels/voxels. Each node has a value corresponding to the intensity value of the pixel/voxel, and each edge has a weight that is a function of the intensities of the nodes connected by the edge. The user labels a subset of pixels/voxels with one of two or more labels, which define regions into which the image will be segmented. These labeled nodes are seeds, and in a situation with 2 label values, define a foreground and a background. The remaining unlabeled pixels/voxels are labeled by computing the probability of the pixel/voxel belonging to the region associated with the label, and assigning each node (pixel or voxel) to the region with a highest probability. In the context of mesh segmentation, the approach is similar. Instead of V representing the pixels/voxels, it represents the points/vertices of a mesh. The algorithm is driven by local geometric properties instead of intensity values.

The random walk algorithm is a very efficient, fast and robust algorithm. A random walk algorithm can perform an efficient segmentation and provide results for a variety of models. It is also interactive and automatic, robust to noise, and easy-to-implement. However, a random walk algorithm depends on certain parameters, which are empirically tuned to yield desired results. On the other hand, it is not straightforward to find the best values of the parameters using manual tuning. Furthermore, the choice of features that represent local geometric properties may also be application dependent. In this disclosure, various geometric features are combined in a general setting, and then their relative weighting is automatically estimated so as to yield best segmentation results.

SUMMARY

Exemplary embodiments of the disclosure as described herein generally include methods and systems for extracting geometric features from a 3D mesh, estimating parameters that characterize edges between faces of the mesh, and a new method of defining edge weights.

According to an embodiment of the disclosure, there is provided a method for segmenting mesh models in digital images, including providing a mesh surface model (V, F, E) of a shape embedded in a 3-dimensional space, where the mesh surface model comprises vertices $V=v_i$, $i=1, \ldots, n$, triangular/polygonal faces $F=f_i$, $i=1, \ldots, m$, and edges $E=e_{ij}=(v, v_j)|v, v_j \in V, i \neq j$, where each edge connects two vertices, providing a ground truth segmentation of the mesh surface model, using the ground truth segmentation to determine weights $w_{ij}$ for edges $e_{ij}$ by solving $$\sum_i \sum_{j \in N_i} (v_i - v_j)^T H(v_i - v_j) = \begin{cases} -\ln \varepsilon & \text{if } l_i \neq l_j, \\ 0 & \text{otherwise,} \end{cases}$$

where $v_i$ and $v_j$ are feature vectors corresponding to vertices $v_i$, $v_j$, H is a matrix of weights, $N_i$ is a neighborhood of vertices around $v_i$, $\varepsilon \ll 1$ is a positive number, and $l_i$ and $l_j$ are segmentation labels of $f_i$ and $f_j$, where the weights $w_{ij}$ are the probabilities of a random walker crossing edges $e_{ij}$ between vertices $v_i$ and $v_j$ in a random walker segmentation initialized with at least two seeds of different labels.

According to a further embodiment of the disclosure, the method includes constructing a feature vector $v_i$ composed of underlying geometric properties of the mesh at each vertex point.

According to a further embodiment of the disclosure, feature vectors include one or more of a dihedral angle, a mean curvature, a Gaussian curvature, a normal curvature, a global curvature geodesic flow, a principle curvature, a geodesic distance, an angular distance, and a volumetric shape image distance.

According to a further embodiment of the disclosure, the feature vector uses the dihedral angle between faces $f_i$, $f_j$, and the weights $w_{ij}$ are determined from $$w_{i,j} = |e_{i,j}|\exp(-d(f_i, f_j)/\sigma), \text{ where } d(f_i, f_j) = d_1(f_i, f_j)/\bar{d}_1,$$

$$d_1(f_i, f_j) = n[1 - \cos(\text{dihedral}(f_i, f_j))] = \frac{n}{2}\|N_i - N_j\|, \bar{d}_1$$

is an average of $d_1(f_i, f_j)$ over all three faces adjacent to face $f_i$, $N_i$ and $N_j$ are the normal vectors of faces $f_i$, $f_j$, dihedral ($f_i$, $f_j$) is the dihedral angle between normal vectors $N_i$ and $N_j$, and $\sigma$ is a predetermined constant that distinguishes between a convex edge and a concave edge.

According to a further embodiment of the disclosure, the feature vector uses the Gaussian curvature, and the mean curvature, and $$d(f_i, f_j) = n \times \max\left(\frac{d_1(f_i, f_j)}{\bar{d}_1}, \frac{d_2(f_i, f_j)}{\bar{d}_2}, \frac{d_3(f_i, f_j)}{\bar{d}_3}\right),$$

where $d_2(f_k, f_i) = |K(f_i) - K(f_k)|, d_3(f_k, f_i) = |H(f_i) - H(f_k)|,$

K is the Gaussian curvature, H is the Mean curvature, $\bar{d}_1$, $\bar{d}_2$ and $\bar{d}_3$ are average values of the functions $d_1(f_i, f_j)$, $d_2(f_i, f_j)$, $d_3(f_i, f_j)$, respectively, and n is a normalization constant.

According to a further embodiment of the disclosure, the feature vector uses distance and normal curvature, and the weights $w_{ij}$ are determined from $w_{ij}=\exp(-d_{ij}^2)$, where $d_{ij}=w_1\|v_i-v_j\|+w_2\|n_i-n_j\|+w_3f(k_{v_iv_j})$, where $v_1$, $v_2$ are vertices at either end of edge $e_{ij}$, $n_i$ and $n_j$ are normal vectors at vertices $v_i$ and $v_j$, respectively, $k_{v_iv_j}$ is the average of normal curvature at $v_i$ along the line direction $v_iv_j$ and the normal direction along $v_iv_j$ where $$k_{v_iv_j} = \frac{k_{v_iv_j} + k_{v_jv_i}}{2}, \text{ and } f(k) = \begin{cases} k, & \text{if } k \geq 0, \\ n|k| & \text{if } k < 0, \end{cases}$$

where n is a predetermined constant that augments negative curvature, and $w_1$, $w_2$, $w_3$ are predetermined coefficients that control a relative importance of the distance, normal direction and curvature.

According to a further embodiment of the disclosure, the feature vector uses a distance between vertices and a difference between normals of the vertices, and the weights $w_{ij}$ of edge $e_{ij}$ are determined from $w_{ij}=\exp(-d_{ij}\bar{d})$, where $d_{ij}=n\|v_i-v_j\|\times\|N(v_i)-N(v_j)\|$, $\|v_i-v_j\|$ is a Euclidean distance between the vertices $v_i$, $v_j$, and $N(v_i)$ and $N(v_j)$ are the normals at vertices $v_i$, $v_j$ respectively, n is a predetermined constant that augments concavity of the edge $e_{ij}$, and $\bar{d}$ is the average value of $d_{ij}$ over the mesh surface model.

According to a further embodiment of the disclosure, the feature vector a distance between vertices, a difference between normals of the vertices, and normal curvature, and the weights $w_{ij}$ of edge $e_{ij}$ are determined from $w_{ij}=|p_i-p_j|+w\times|n_i-n_j|+w^*\times f(k_{p_ip_j})$, where $p_i$, $p_j$ are adjacent vertices, $n_i$, $n_j$ are the normals of $p_i$, $p_j$ respectively, $k_{p_ip_j}$ is the directional curvature along the line $p_ip_j$, w and w* are predetermined constants, and f is a curvature function defined as $$f(k_D) = \begin{cases} k_D & \text{if } k_D \geq 0, \\ g(k_D), & \text{if } k_D < 0. \end{cases}$$

where g is an augmentation function that augments an effect of negative curvature.

According to a further embodiment of the disclosure, a vertex normal is an average of face normals of faces that surround the vertex.

According to a further embodiment of the disclosure, extracting features further comprises determining a geodesic distance of each vertex on each ring of a plurality of rings about a center vertex, where an $i^{th}$ ring around a vertex $v_0$ is a set of vertices v in the mesh model where there exists a shortest path from $v_0$ to v containing i edges, computing an average curvature within each ring, weighting the geodesic distance of each vertex by the average ring curvature, and forming a feature vector from the geodesic distances of each vertex.

According to another embodiment of the disclosure, there is provided a non-transitory program storage device readable by a computer, tangibly embodying a program of instructions executed by the computer to perform the method steps for segmenting mesh models in digital images.

BRIEF DESCRIPTION OF THE DRAWINGS

FIG. 3 illustrates how curvature may be defined, according to an embodiment of the invention.

FIGS. 4(a)-(b) illustrates concentric curves based on the geometric and isophotic distances, respectively, according to an embodiment of the invention.

FIG. 10 is a table of statistical results for segmentations according to an embodiment of the disclosure.

FIG. 11 is a table of statistical results for parameter estimations segmentations according to an embodiment of the disclosure.

DETAILED DESCRIPTION OF EXEMPLARY EMBODIMENTS

Figure 1:
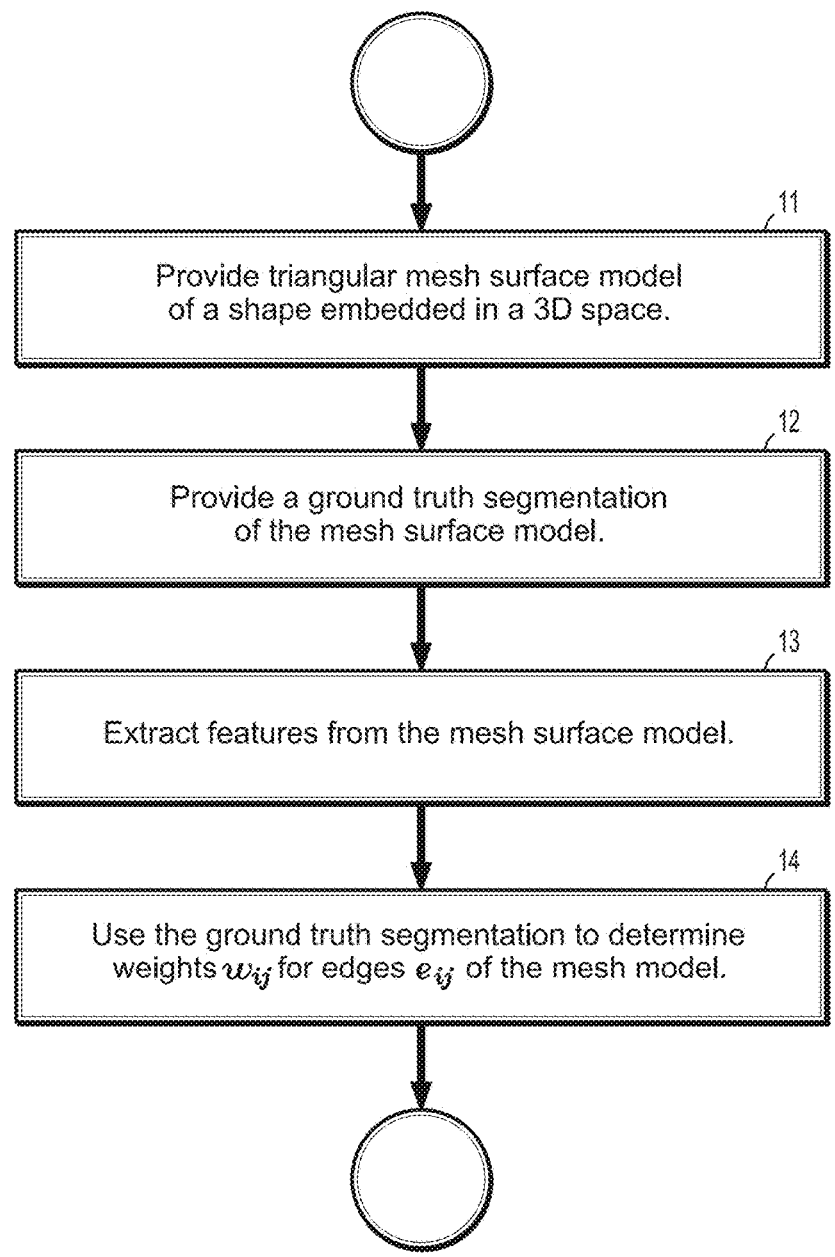
FIG. 1 is a flow chart of a method of estimating parameters for a random walk segmentation of a mesh model, according to an embodiment of the invention.

Exemplary embodiments of the disclosure as described herein generally include methods and systems for developing a random walker segmentation approach that combines various meaningful geometric features, and estimates their relative weighting (segmentation parameters) for improved segmentation results. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

As used herein, the term "image" refers to multi-dimensional data composed of discrete image elements (e.g., pixels for 2-D images, voxels for 3-D images, vertices of triangular or polygonal meshes for object boundaries). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems or video surveillance systems, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

The random walker algorithm is disclosed in U.S. Pat. No. 7,460,709, issued on Dec. 2, 2008, to Leo Grady, a co-inventor of the present disclosure, the contents of which are herein incorporated by reference in their entirety. The random walk algorithm uses a random walker that starts from an unlabeled node, and a probability is calculated for the first seed points reached. At the end, each node is assigned to the label for which the greater probability is calculated. The probability computation is determined by solving a system of linear equations, specifically a sparse, positive-definite Laplacian matrix L which represents the graph. The Laplacian L, indexed by nodes $v_i$, $v_j$ is estimated as follows:

$$L_{v_i v_j} = \begin{cases} d_{v_i} & \text{if } i = j, \\ -w_{ij} & \text{if } v_i \text{ and } v_j \text{ are adjacent nodes}, \\ 0 & \text{otherwise}, \end{cases}$$

where, $d_{v_i}$ is the degree of vertex $v_i$ and $w_{ij}$ is the weight of edge ij. The nodes $v_i$ and $v_j$ are partitioned into two sets, $V_M$, the marked/seed nodes, and $V_U$, the unmarked nodes, such that $V_M \cup V_U = V$ and $V_M \cap V_U = 0$. $V_M$ contains all seed points irrespective of their labels. The matrix L can be reordered to reflect its subsets:

$$L = \begin{bmatrix} L_M & B \\ B^T & L_U \end{bmatrix}.$$

The probability assumed at each node, $v_i$ for each label s, is denoted by $x_i^s$. The set of labels for the seed points are defined by a function $Q(v_j)=s$, $\forall v_j \in V_M$, where $s \in Z$, $0 < s \leq K$. A marked vector is defined for each label, s, at node $v_j \in V_M$ as $$m_j^s = \begin{cases} 1 & \text{if } Q(v_j) = s, \\ 0 & \text{if } Q(v_j) \neq s. \end{cases}$$

Then, $$L_U x^s = -Bm^s,$$

which is a sparse, symmetric, positive-definite, system of linear equations with $|V_U|$ number of equations and a number of nonzero entries equal to $2|E|$, where E is the number of edges. Because $L_U$ is guaranteed to be nonsingular for a connected graph, the solution $x^s$ is guaranteed to exist and be unique. Therefore, the probabilities for all the labels may be found by solving $$L_U X = -BM,$$

where X has columns taken by each $x^s$ and M has columns given by each $m^s$. Therefore, there are K−1 sparse linear systems to solve, where K is the total number of labels.

According to an embodiment of the disclosure, a triangular mesh surface model of a shape embedded in a 3D space is considered, which is a triple (V, E, T) of vertices $V = v_i | v_i \in R^3$, i=1, . . . , m, edges $E = e_{ij} = (v_i, v_j) | v_i, v_j \in V$, i≠j, and faces $T = t_{ijk} = (v_i, v_j, v_k) | v_i, v_j, v_k \in V$, i≠j, j≠k, k≠i. In general, a mesh surface model may be polygonal, and methods are by no means limited to triangular meshes. The use of terminology "triangular mesh" is only for simplicity, and methods according to embodiments of the invention apply to polygonal meshes as well. Note that faces can also be represented using a single index that represents the three vertex indices. According to an embodiment of the disclosure, it may be assumed that the edges are undirected and each edge $e_{i,j}$ is assigned a weight $w_{i,j}$, which represents a probability of a random walker of crossing the edge In an interactive 3D mesh segmentation according to an embodiment of the invention, it is assumes that an object is represented by a triangulated (polygonal) mesh that is represented as a Graph G<V, F> where V are the vertices, and F are the faces of the 3D mesh model. A user selects some initial seed vertices (or faces) that should be in a segmented region. If faces are selected as seeds, one may choose the dual mesh such that the faces become the vertices of the dual mesh, or one can select the vertices on each face on the original mesh as the seed vertices. Therefore, without loss of generality it may be assumed that n vertices are selected as seed points:

$s_1, \ldots , s_n$: seed points;
$f_1, \ldots , f_m$: non-seed points.

For each non-seed vertex, there are q edges, each of these is assigned a probability: $p_{k,l}$, $p_{k,q}$ that satisfy:

$$\Sigma_j p_{i,j} = 1.$$

These probabilities represent the probability that a random walker will move across a particular edge to the corresponding neighbor.

Assume that $P^l(f_k)$ is the probability of a random walker starting from point $f_k$ and arriving at seed point $s_l$ for l=1, . . . , n. Then, $$P^l(s_l)=1, P^l(s_k)=0 \forall k \neq l.$$

As the number of steps increases, the following equation holds:

$$P^l(f_k) = \Sigma p_{k,i} P^l(f_{k,i})$$

Assume that $P^l(f_k) = P_l$ is a column vector of length m. Then, the last equation can be rewritten as:

$$A_{m \times n} P^l = B^l,$$

where most of the $B^l$'s are zero and A is independent of choice of l. According to an embodiment of the disclosure, putting the $P^l$'s together will yield an m×n matrix $P_{m \times n}$, and the following sparse linear system of equation holds:

$$AP = B, \ B = (B_1, \ldots, B_n),$$

where A is positive and the solution is uniquely determined.

For each vertex $f_k$, there may be n different probabilities, but choose only the one that maximizes the probabilities:

$$P^l(f_k) = \max(P^t(f_k)) \text{ for } t = 1, \ldots, n.$$

There are many algorithms to determine the best probabilities. Once the best probability is found, the vertex $f_k$ is assigned to the corresponding label l.

Computation of the probabilities depends on the features that capture the underlying surface geometric properties. Different segmentation models rely on different features, such as local curvature. Once a feature vector is designed, the similarity between two vertices of the mesh can be measured in terms of the differences in their properties, i.e., the feature vectors that represent the local geometry. However, instead of using a Euclidean distance between the feature vectors directly, the effect of the features is controlled via a shaping function which also determines the weighting of various features within a feature vector. The shaping function also allows robustness to noise as it limits the effects of excessive values. The behavior of the shaping function is defined by different parameters. For example, if a Gaussian model is being used, then the parameters are the mean and variance. These parameters can be estimated from the data. Exemplary, non-limiting shaping functions include a Gaussian function and a Cauchy function. Note that a univariate Gaussian distribution has only two parameters, whereas a multivariate Gaussian has many parameters (mean vector and covariance matrix). Since features are being represented as vectors, the shaping function is a multivariate function that has a vector of parameters. Now, there are different approaches on how to select the parameters. The weights can be empirically set to be uniform constant, or different constants for concave and convex vertices, or be estimated from data so as to maximize segmentation performance. Embodiments of the invention are directed to estimating weights from mesh data based on random walks.

Parameter estimation is a common task in statistics and machine learning. The basic idea is that there exist prior segmentations for similar class of models. These prior segmentations are referred to as "ground truth", and may be manually annotated offline on the training data. The ground truth segmentations are used as a training set to estimate the parameters to maximize the segmentation accuracy on the training set. Then the same parameters are used for a test case, under the hypothesis is that parameters tuned for a similar class of shapes will yield better segmentation results compared to empirically selected non-optimal weights. Note that the probability should decrease at a region boundary so that there is no random walk across the segmentation boundaries. Thus, the weights should be designed such that the shape function is zero at the segmentation boundaries, and 1 in the interior region.

According to an embodiment of the invention, an approach such as that illustrated by the flowchart of FIG. 1 is adopted for the parameter estimation. Referring now to the figure, a triangular mesh surface model of a shape embedded in a 3D space is provided at step 11. An exemplary triangular mesh surface model may be represented by a triple (V, E, T) of vertices $V = v_i | v_i \in R^3$, $i = 1, \ldots, m$, edges $E = e_{ij} = (v_i, v_j) | v_i, v_j \in V, i \neq j$, and faces $T = t_{ijk} = (v_i, v_j, v_k) | v_i, v_j, v_k \in V, i \neq j, j \neq k, k \neq i$. However, in other embodiments, a triangulated mesh may be represented as a graph G<V, E> where V are the vertices and E are the edges of the 3D mesh model, or as a graph G<E, F> where E are the edges and F are the faces of the 3D mesh model. At step 12, a ground truth segmentation of the mesh surface model is provided. In addition, at step 13, a feature vector is extracted from the mesh surface model. The ground truth segmentation is used with the feature vector at step 14 to determine weights $w_{ij}$ for edges $e_{ij}$ of the mesh model. Let the weights be represented by a matrix H (a zero mean Gaussian Covariance matrix), then a Gaussian shaping function for a walk from point $p_i$ on vertex $t_i$ to a point $p_j$ on neighbor vertex $t_j$ is: $g(f_i, f_j) = e^{-(f_i - f_j)^T H (f_i - f_j)}$, where $f_i$ and $f_j$ are the corresponding feature vectors. Then, for all such walks:

$$\Pi g(f_i, f_j) = e^{-\Sigma (f_i - f_j)^T H (f_i - f_j)} = \begin{cases} \overset{o}{a} & \text{if } l_i \neq l_j, \\ 1 & \text{otherwise} \end{cases}$$

where $\epsilon$ is a small positive number, $l_i$, and $l_j$ are the segmentation labels of $p_i$ and $p_j$. Taking the log on both sides yields:

$$\sum_i \sum_{j \in N_i} (f_i - f_j)^T H(f_i - f_j) = \begin{cases} -\ln \overset{o}{a} & \text{if } l_i \neq l_j, \\ 0 & \text{otherwise,} \end{cases}$$

where $N_i$ is a small neighborhood around $p_i$. This equation can be solved for H using the training segmentations, which yields the optimal weights. Similar equations can be derived for a Cauchy shaping function: $g(f_i, f_j) = 1/((f_i - f_j)^T H(f_i - f_j) - 1)$.

For a probability computation in a random walk algorithm according to an embodiment of the disclosure, meaningful features should be extracted based on the minima rule, and geometrical features that depend on concavity and convexity should be captured. According to embodiments of the invention, the features in the feature vector may include dihedral angles, mean curvature, Gaussian curvature, normal curvature, global curvature geodesic flow, principle curvatures, position and normal variation of point cloud data (PCD), geodesic distance, angular distance, and volumetric shape image distance. However, according to other embodiments of the invention, features are not limited to those just listed. According to embodiments of the invention, all feature vectors can be combined, and then an optimization can be used to find a best combination. Redundant features will have their contribution drop to zero.

A parameter estimation procedure according to an embodiment of the invention was performed for a plurality of segmentation models, and results are provided below. The features of all methods can also be combined into a single optimization. Algorithms for which a parameter estimation according to an embodiment of the invention was implemented include fast mesh segmentation using random walks, interactive mesh cutting using constrained random walks, random walks for mesh denoising, robust interactive mesh cutting using fast geodesic curvature flow, easy mesh cutting, and global curvature geodesic flow. According to further embodiments of the invention, convex and concave vertices can be treated separately, and two sets of estimations can be performed, one for the weights for convex vertices, and another for concave vertices. Here, a convex set is a set of points that containing all line segments between each pair of its points, and a concave set is the opposite.

Fast Mesh Segmentation Using Random Walks

Fast mesh segmentation using random walks is an extension of a mesh denoising algorithm for both graphical and engineering models that yields reliable results. This approach uses both interactive and automatic segmentation. Embodiments of the disclosure use interactive segmentation, and use two different methods for computing the random walker probability. The edge weight computation is based on dihedral angle between the adjacent faces, the mean curvature and the gaussian curvature.

Graphical Models:

According to an embodiment of the disclosure, for graphical models, a dihedral angle will be used for computing the probability. In general, a dihedral angle is the angle between two planes. More specifically, for a mesh according to an embodiment of the disclosure, the dihedral angle is the angle between two adjacent faces/triangles. Assume there are two triangles A, B sharing a coming edge and their unit face normals $n_A$, $n_B$. The dihedral angle can be estimated from the following equation:

$$\cos \phi_{AB} = n_A \cdot n_B.$$

Note that the dihedral can be signed. This definition should take into account that $\phi_{AB}$ is the angle where the triangle A rotates about the common line intersection to align with the plane/triangle/face B. Thus, $\phi_{AB} = -\phi_{BA}$.

Letting $n_A = (a_1, b_1, c_1)$ and $n_B = (a_2, b_2, c_2)$, the above definition is:

$$\cos\phi_{AB} = \frac{a_1 a_2 + b_1 b_2 + c_1 c_2}{\sqrt{a_1^2 + b_1^2 + c_1^2} \sqrt{a_2^2 + b_2^2 + c_2^2}}.$$

Consider a vector $n=(a, b, c)$ which has direction and length. With normalization, the direction of the vector remains the same, but the length is set equal to 1. To do this, apply:

$$n^* = \left( \frac{a}{\sqrt{a^2+b^2+c^2}}, \frac{b}{\sqrt{a^2+b^2+c^2}}, \frac{c}{\sqrt{a^2+b^2+c^2}} \right).$$

According to an embodiment of the disclosure, the dihedral angle between normals $N_i$, $N_k$ of adjacent faces $f_i$, $f_k$, may be calculated as:

$$d_1(f_i, f_k) = m[1 - \cos(\text{dihedral}(f_i, f_k))] = \frac{m}{2} \| N_i - N_k \|.$$

The parameter m can have any value, but according to minimal rule, priority is given to concavity. Thus, according to an embodiment of the invention, m=1 for concave faces and m=0.2 for convex faces. These parameters were manually estimated.

According to an embodiment of the invention, normalization is used and the final probability for the respective edge $e_{i,k}$ is:

$$d = \frac{d_1(f_i, f_k)}{d_i},$$

where $d_i$ is the mean value of $d_1$. According to an embodiment of the disclosure, the edge weight may be defined as $$w_{i,k} = |e_{i,k}| \exp(-d(f_i, f_k))/(\delta)$$

where σ is used to control how variation of differences maps to variations in probability: σ=1.0.

Consider the exponential. It is convenient to use, because it can map from $(0, +\infty) \rightarrow (0, 1)$. This means that a higher difference corresponds to a lower probability. Thus, a large difference in the dihedral angle means a large difference between the face normals. Thus the faces are convex and the probability to cross this edge is low due to the large convexity. While when the difference is small, the faces are almost planar and the probability of the random walker to cross the edge is high.

Engineering Models:

According to an embodiment of the disclosure, for engineering models, the mean and Gaussian Curvature are used to define a probability. There are different types and definitions of curvature, which include minimum curvature, maximum curvature, Gaussian curvature, and mean curvature. Curvature is a property of a surface that concerns local shape information, does not provide region information. For example, assume that there is a curve C as shown in FIG. 3. The center of curvature may be defined as the intersection point P of two normals that are infinitely close to the curve. The radius of curvature is the distance from the point and the curvature is defined as the reverse of the radius:

$$k = \frac{1}{R}$$

where R is the radius of the curvature. Thus, when R increases, the curvature k decreases and vice versa. On the other hand, a surface may curve in all directions at any point.

A shape operator is a type of extrinsic curvature of a surface and is the differential of the Gaussian map f and is defined as a linear operator by the formula:

$$(S_x u, w) = (df(u), w)$$

where v, w are the tangent vectors to the surface. The eigenvalues of $S_x$ are the principal curvature $\kappa_1$, $\kappa_2$ that determine the directions in which a surface bends at each point, known as the principal directions. The principal directions specify the directions in which a curve embedded in the surface must travel to have maximum or minimum curvature. The maximum principal curvature is referred to as the maximum curvature, and the minimum principal curvature is referred to as the minimum curvature.

The determinant of the shape operator is referred to as the Gaussian Curvature and is defined as:

$$K = \kappa_1 \times \kappa_2$$

Primitive curvatures play a role in surface theory. If both $\kappa_1$, $\kappa_2$ have the same sign, then $\kappa_1 \times \kappa_2 > 0$, the Gaussian curvature is positive and the surface is said to have an elliptic point (locally convex or concave). If $\kappa_1 \times \kappa_2 < 0$, the Gaussian is negative and the point is a hyperbolic point (locally saddle). If $\kappa_1 \times \kappa_2 = 0$, the Gaussian curvature is zero and the point is a parabolic point (locally developable). If $\kappa_1 = \kappa_2 = 0$ the point is planar, and if $\kappa_1 = \kappa_2$ the point is an umbifical point.

Half the trace of the shape operator is the mean curvature and is defined as $$H = \frac{1}{2(\hat{e}_1 + \hat{e}_2)}$$

for a surface. However, for an n-dimensional hypersurface T the mean curvature is given by:

$$H = \frac{1}{n} \sum_i \hat{e}_i.$$

According to an embodiment of the disclosure, the following equations are used:

$$d_2(f_k, f_i) = |K(f_i) - K(f_k)|,$$

$$d_3(f_k, f_i) = |H(f_i) - H(f_k)|,$$

where K is the Gaussian curvature and H is the Mean curvature. According to an embodiment of the disclosure, for the estimation of the final probability, the following equations are used:

$$d(f_i, f_k) = \max\left(\frac{d_1(f_i, f_k)}{\overline{d}_1}, \frac{d_2(f_i, f_k)}{\overline{d}_2}, \frac{d_3(f_i, f_k)}{\overline{d}_3}\right)$$

where $\overline{d}_1$, $\overline{d}_2$ and $\overline{d}_3$ are average values of the corresponding difference function over the whole model. According to an embodiment of the disclosure, the maximum of these three quantities is used instead of a weighted average, because the peak responses of any component are significant and this approach also avoids choosing appropriate weights. This method can separate smoothly touching regions. Normalization at the end is needed.

Interactive Mesh Cutting Using Constrained Random Walks

This algorithm allows users to specify a desired cutting, and uses an initial normalization to make the maximum distance between two adjacent vertices on the mesh be equal to 1. The edge weights are based on the isophotic metric and the normal curvature. The isophotic length of a surface curve depends not only on the curve itself, but also on the variation of the surface normals along it. If this variation is weak, the isophotic metric is close to the Euclidean metric, but if this variation is strong, the length increases. The isophotic length is a sensitive metric for those features. FIG. 4(b) illustrates concentric curves based on the isophotic distance, and FIG. 4(a) illustrates concentric curves based on a geometric distance. According to an embodiment of the disclosure, the computation of an edge weight for edge $e_{ij}$ starts by calculating an isophotic distance:

$$d_{ij} = w_1 \|v_i - v_j\| + w_2 \|n_i - n_j\| + w_3 f(k_{v_i v_j})$$

where $k_{v_i v_j}$ is the average of normal curvature at $v_i$ along the line direction $v_i v_j$ and the normal direction along $v_j v_i$:

$$k_{v_i v_j} = \frac{k_{v_i v_j} + k_{v_j v_i}}{2}$$

and $$f(k) = \begin{cases} k, & \text{if } k \geq 0, \\ n|k| & \text{if } k < 0. \end{cases}$$

According to an embodiment of the disclosure, the number n=5 is a non-limiting value that is used to augment the effect of the negative curvature, which according to the minimal rule. The coefficients $w_1$, $w_2$, $w_3$ control the relative importance of the distance, normal direction and curvature. These coefficients satisfy the following equations:

$$\text{avg}(w_1 \|v_i - v_j\|) = 0.1,$$

$$\text{avg}(w_2 \|n_i n_j\|) = 0.1,$$

$$\text{avg}(w_3 f(k_{v_i v_j})) = 0.1,$$

$$\text{avg}(d_{ij}) = 1.0,$$

where avg(x) is the average of quantity x over the whole mesh model.

The largest distance $d_{ij}$ corresponds to a smallest weight $w_{ij}$ according to the following Gaussian function, which can maximize the entropy of the resulting weights:

$$w_{ij} = \exp(-d_{ij}^2).$$

The normal curvature for a discrete triangular mesh at $v_i$ along $v_i v_j$ is, up to a sign, the signed curvature of the curve on a normal section of the surface, and may be calculated by any of various procedures known in the art.

Random Walks for Mesh Denoising

Random walks can be used to remove noise from mesh data in a process that includes filtering the normals, and adjusting the vertices.

Filtering the normals includes performing a weighted average of the face normals to compute new normal values. However, instead of averaging uniformly over an entire neighborhood, similarities of the face normals are taken into account, where weights are derived from the similarities of neighboring normals. Similar face normals will have higher weights. The weights in turn are computed using random walks along the mesh.

First, the probabilities of walking from one face to another are computed by moving a fixed number of steps. The probability of a random walk from one face to its neighbor is computed as the angle between the two face normals. A Guassian shaping function is applied to control the similarity, and its width parameter is adaptively adjusted to enhance the feature preservation. Once the probabilities are computed, the weighted averaging is carried out in a straightforward manner. For vertex adjustment, the filtered face normals are used in a least square sense to update vertex positions.

According to an embodiment of the invention, random walks are used for a different situation, i.e., mesh segmentation, using an a priori labeling of the mesh. Parameters are computed to optimize the segmentation accuracy. The probabilities are finally thresholded to obtain a segmentation.

Robust Interactive Mesh Cutting Using Fast Geodesic Curvature Flow

This algorithm is based on the difference between the vertices and the difference between the normals of the vertices, and uses an initial segmentation computed from a random walk algorithm, and then computes the geodesic curvature, by solving a piecewise linear function. The result is the value of each vertex on the mesh. According to an embodiment of the invention, a faster method of calculating geodesic flow decreases the degree of the system of equations.

A probability estimation according to an embodiment of the invention takes into account the geometry and the minima rule:

$$d_{ij}=n\|v_i-v_j\|\times\|N(v_i)-N(v_j)\|,$$

where $\|v_i-v_j\|$ is the Euclidean distance between the vertices $v_i$, $v_j$, and $N(v_i)$ and $N(v_j)$ are the normals of the surface at vertices $v_i$, $v_j$ respectively. The following holds for the parameter n:

n=5, if $e_{ij}$ is concave, n=1, otherwise, according to the minima rule.

According to an embodiment of the disclosure, the mesh model is first uniformly scaled into a unit bounding box. At the end a Gaussian function is applied according to the following equation:

$$w_{ij}=\exp(-d_{ij}/\overline{d})$$

where $\overline{d}$ is the average value of $d_{ij}$ over the entire mesh.

Easy Mesh Cutting

This algorithm uses a modification of the isophotic metric, which is a surface metric in which the length of a surface curve depends not only on the curve itself, but also on the variation of the surface normals along it. The isophotic metric is combined with a normal curvature computed in one direction and an augmentation function exp(x)−1. According to an embodiment of the disclosure, assume there are two point p, q on a surface and a path γ on the surface connecting these two points: an isophotic distance may be defined as $$d_\gamma(p,q)=ds+w\times ds,$$

where ds is the arc element Fds* of a Gaussian image γ* of γ, and w>0. A modification involves a curvature property into the metric:

$$d_\gamma(p,q)=ds+w\times ds^*+w^*f(k_D)ds,$$

where $k_D$ is the normal curvature of γ and f is a curvature function defined as:

$$f(k_D) = \begin{cases} k_D & \text{if } k_D \geq 0, \\ g(k_D), & \text{if } k_D < 0. \end{cases}$$

where g is an augmentation function. According to an embodiment of the disclosure, an exemplary, non-limiting augmentation function is g(x)=exp(x)−1.

According to an embodiment of the disclosure, assume there are two adjacent vertices $p_i$, $p_j$. Then, an edge weight $w_{ij}$ according to an embodiment of the disclosure may be defined as:

$$w_{ij}=|p_i-p_j|+w\times|n_i-n_j|+w^*\times f(k_{p_ip_j}),$$

where $n_i$, $n_j$ are the normals of $p_i$, $p_j$ respectively, and $k_{p_ip_j}$ is the directional curvature along the line $p_ip_j$. This approach to segmentation can be used in real time, and can be used for interactive graphics applications. According to an embodiment of the disclosure, an exemplary, non-limiting values for the parameters $w_{ij}$ w* is 5.

According to an embodiment of the disclosure, there are two different normal computations: face normals and vertex normals.

Face Normals:

Each face in a mesh model has a normal vector perpendicular to the face whose direction is away from the face. According to an embodiment of the disclosure, assume that there is a triangle ABC with the vertices: A(a1, a2, a3); B(b1, b2, b3); and C(c1, c2, c3), and define two vectors AB and AC as: AB=((b1−a1), (b2−a2), (b3−a3)) and AC=((c1−a1), (c2−a2), (c3−a3)). The next step is to compute the cross product of these two vectors:

$$AB\times AC=\|AB\|\times\|AC\|\sin\theta,$$

where θ is the angle between the vectors AB, AC, while AB×AC is perpendicular to these two vectors, and its orientation is given by the right hand rule.

Figure 5B:
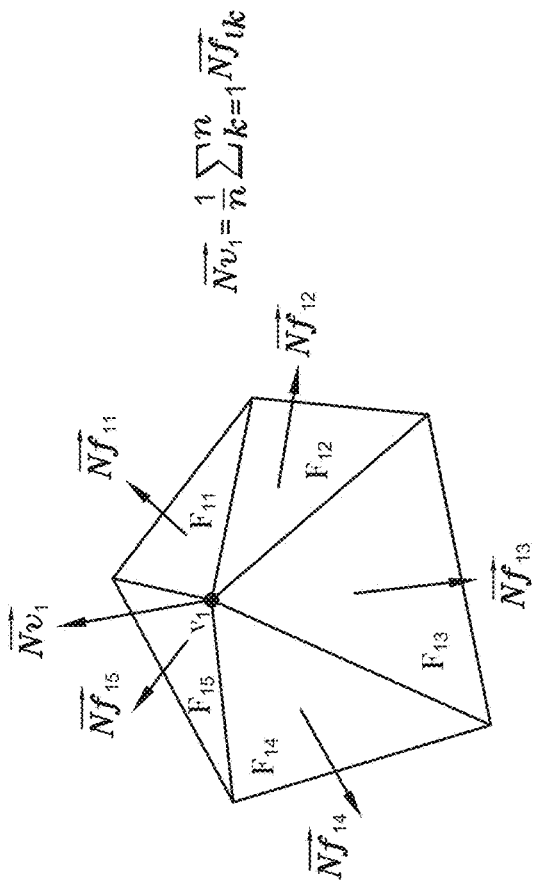
FIG. 5(a) illustrates face and vertex normals, respectively, according to an embodiment of the invention.
Figure 5A:
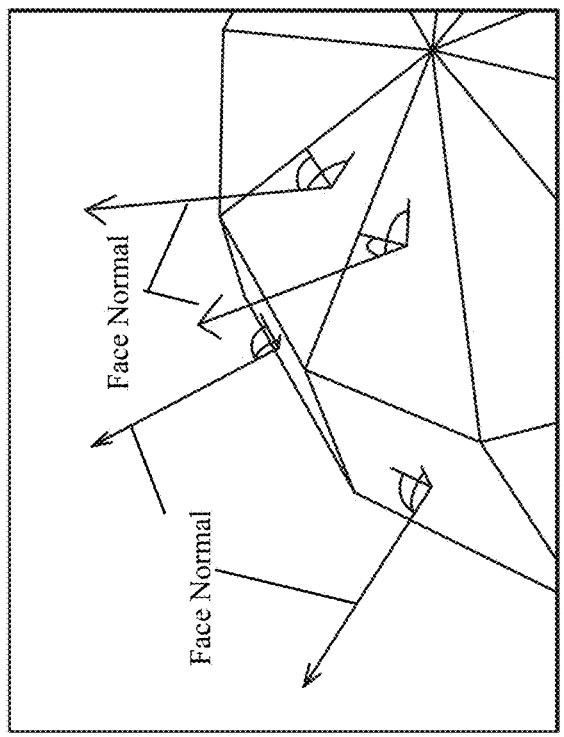

Vertex Normals:

A vertex normal is an average of all the face normals of the surrounding faces. FIG. 5(a) illustrates face normals, and FIG. 5(b) illustrates a vertex normal.

Global Curvature Geodesic Flow

Figure 2:
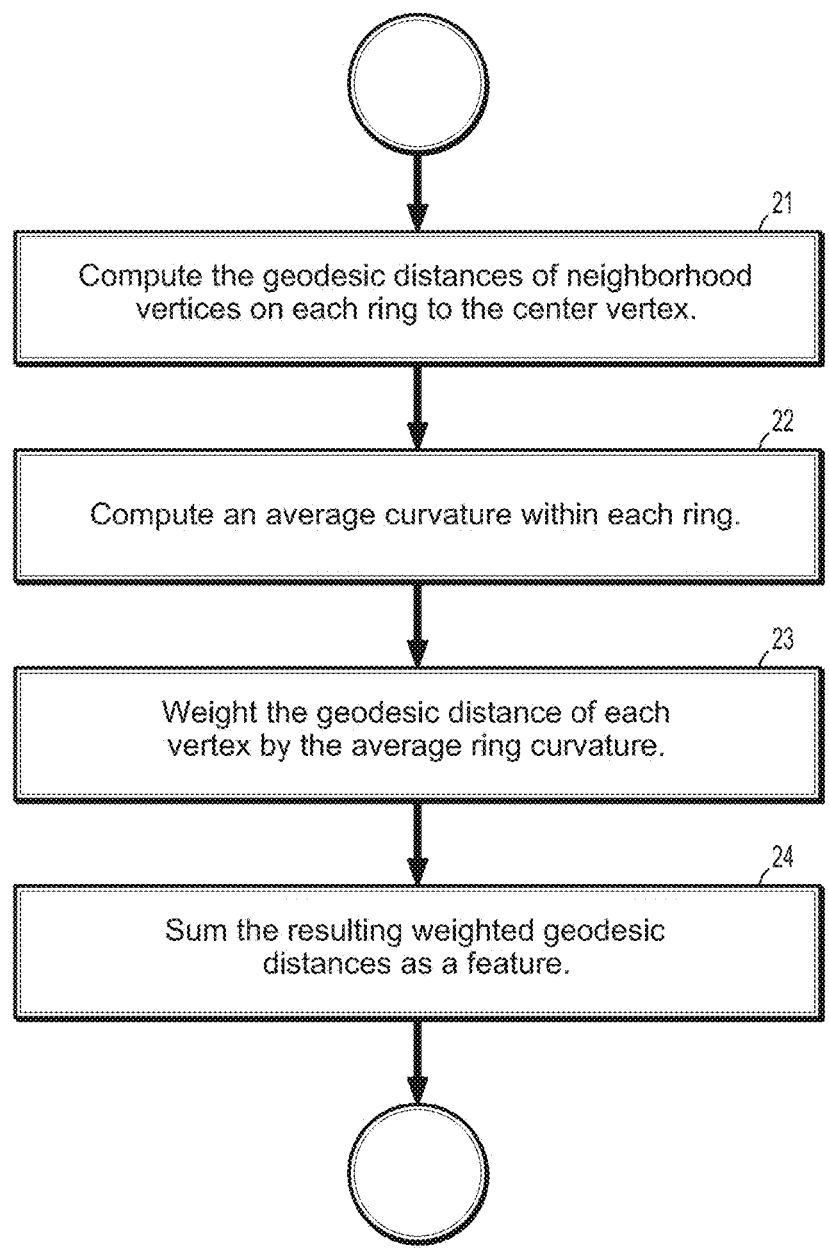
FIG. 2 is a flow chart of a method of determining edge weights in a segmentation model according to an embodiment of the invention.

Another method according to an embodiment of the disclosure of determining edge weights is shown in the flow chart of FIG. 2. Assume there is a triangulated mesh G<V, E>. To compute the probability for the random walks, a weight is needed for each edge. Let $v_i$, $v_j$ be two adjacent vertices and $e_{ij}$ be the edge that connects them.

Figure 6:
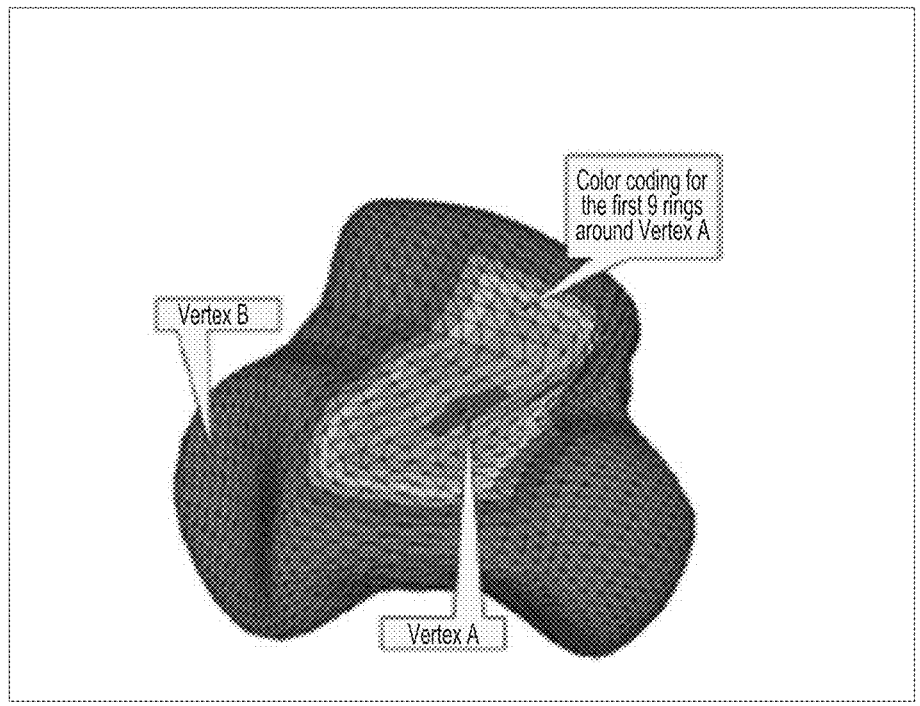
FIG. 6 illustrates a 9-ring neighborhood about a vertex, according to an embodiment of the invention.

Given a specified vertex $v_0$ of the mesh, a set of 'rings' can be defined around the vertex. According to an embodiment of the disclosure, the $i^{th}$ ring around vertex $v_0$ may be defined as the set of vertices v∈V such that there exists a shortest path from $v_0$ to v containing i edges. The set of rings $R_1$, i<N defines the N-ring neighborhood about $v_0$, and is found progressively. Starting with only $v_0$ in $R_i$, a 1-ring neighborhood $R_1$ is the union of $R_0$ and $S_1$, which is the set of immediate neighbors of $v_0$ that share a common edge with $v_0$. The i-th ring is the union of $R_{i-1}$ and $S_i$, where $S_i$ is the set of immediate neighboring vertices of $S_{i-1}$. FIG. 6 shows the first nine rings around a selected vertex A of the mesh. For each vertex, the number of 1-Ring neighbors may be different and depends on the triangulation.

Referring now to FIG. 2, once the rings have been determined, the geodesic distances of neighborhood vertices on each ring to the center vertex are computed at step 21. Each ring may be regarded as a level set based on geodesic distance. Then, rings may be grouped and within each grouped ring, at step 22, an average curvature is computed, and the geodesic distance of each vertex is weighted by the average grouped ring curvature at step 23. The resulting weighted geodesic distances are summed as a feature at step 24.

Experiments

Figure 7:
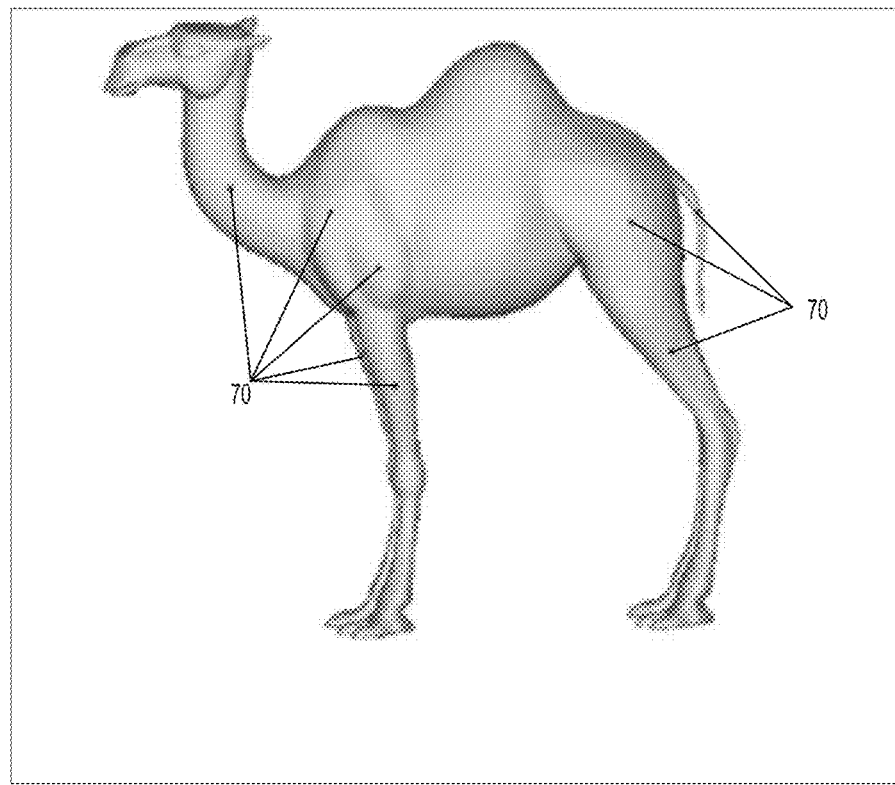
FIG. 7 shows the datasets of a mesh model of a camel, along with the selected seed points, according to an embodiment of the invention.
Figure 8A:
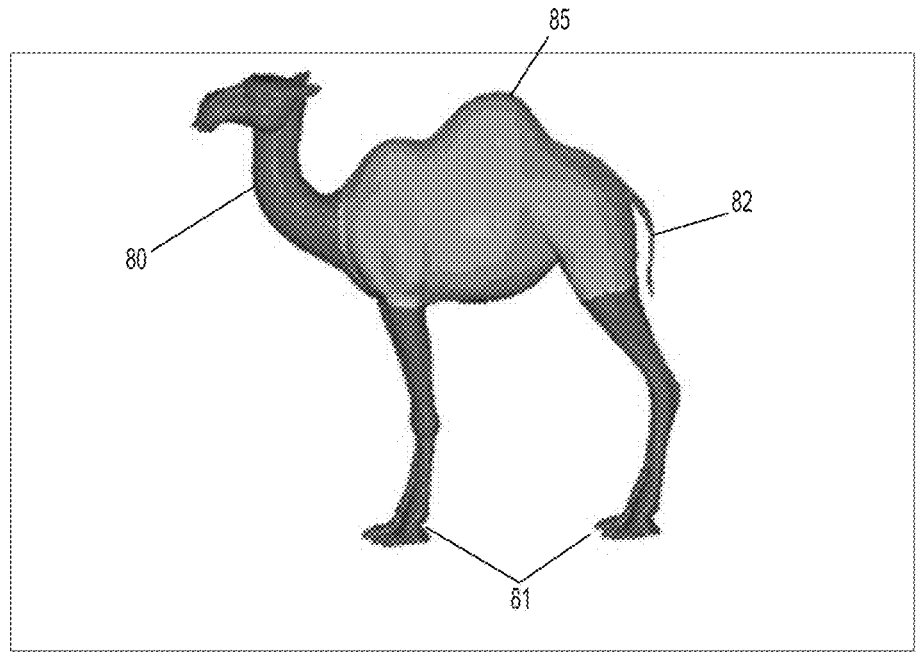
FIGS. 8(a)-(e) show segmentation results, according to an embodiment of the invention.
Figure 8B:
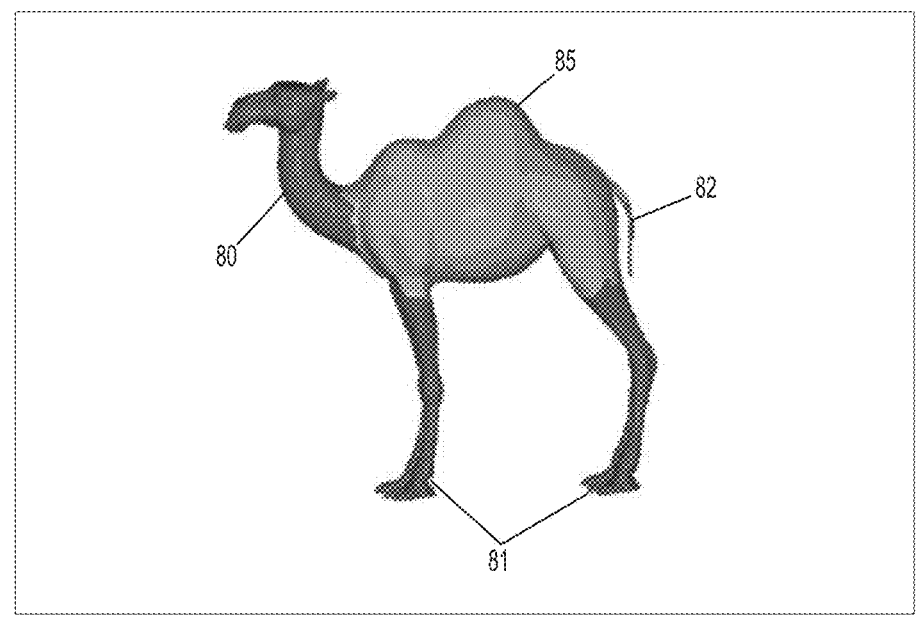
Figure 8C:
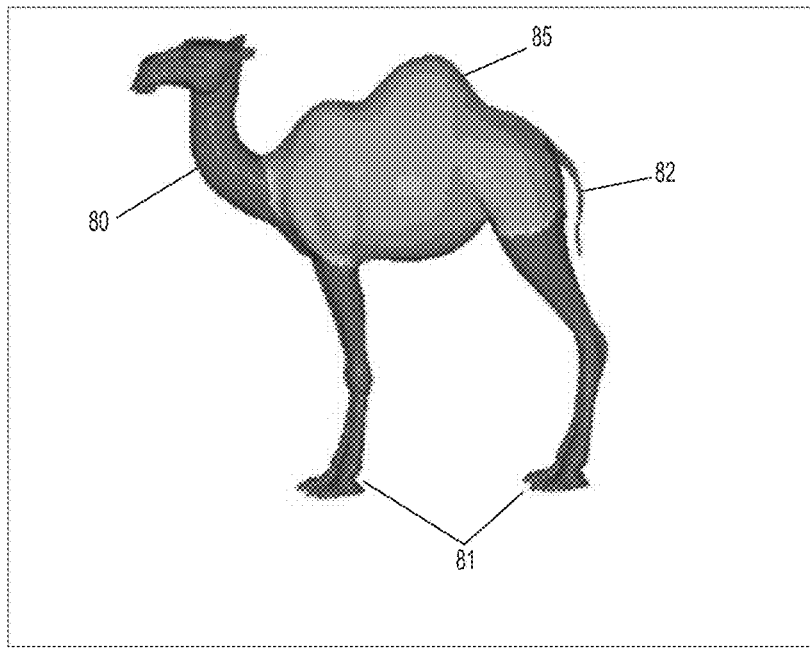
Figure 8D:
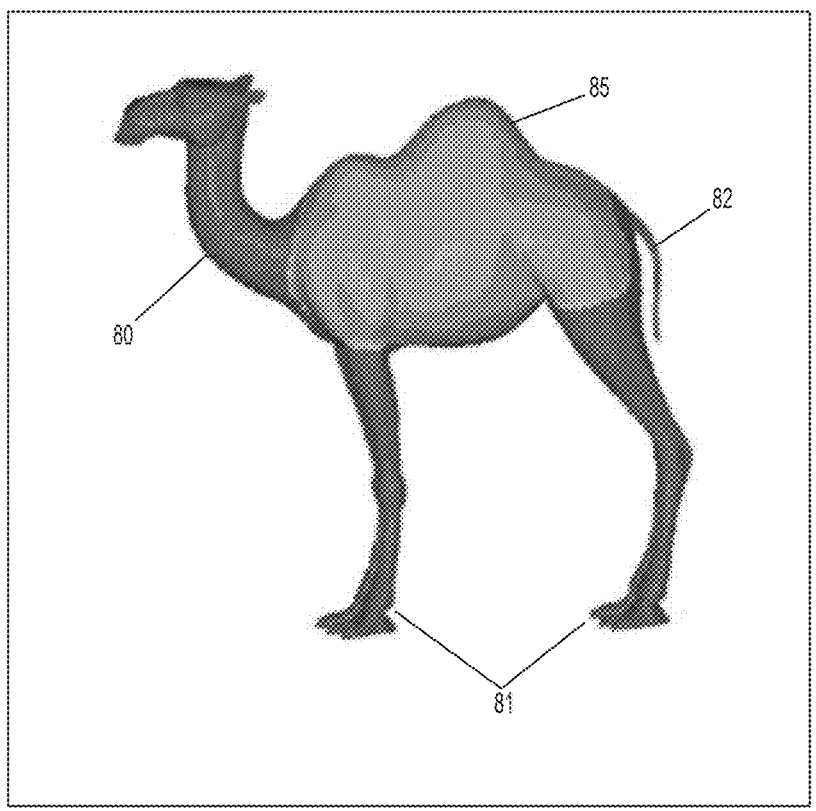
Figure 8E:
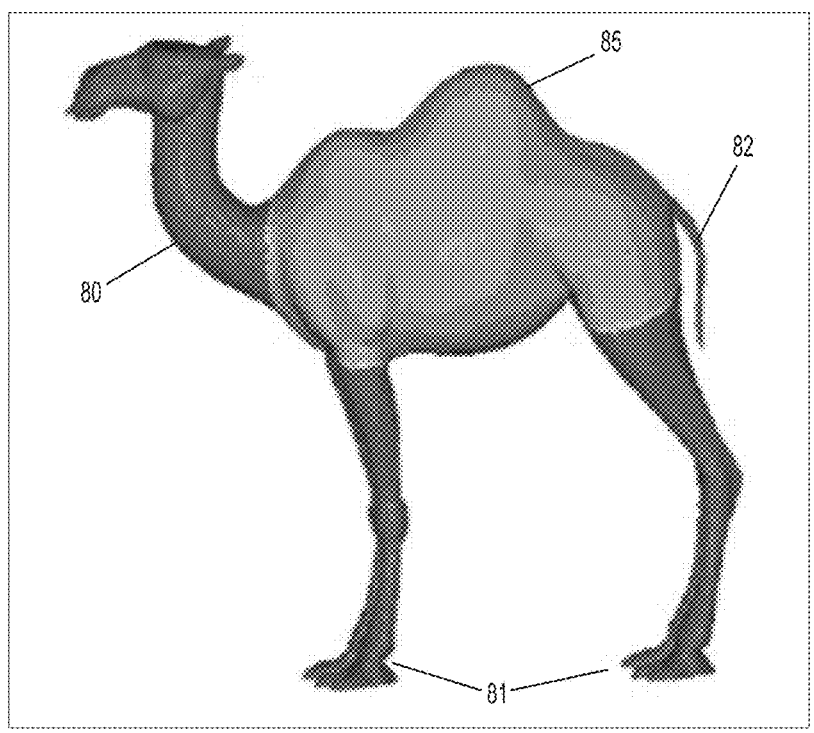

According to embodiments of the disclosure, weights were calculated for each model and the results are described below. For comparison purposes, the seed points that were selected by the user are the same for each method. The datasets are a mesh model of a camel, which is shown in FIG. 7 along with the selected seed points 70. The results are generated using a random walk algorithm, and the probability computation uses different algorithms that depend on deferent features. The aim in all cases is to capture the highest curvature and use this to separate the surface into meaningful pieces. The segmentation results are shown in FIGS. 8(a) to 8(e). In each of these figures, the camel's neck and head 80, legs 81 and tail 82 are segmented from the body 85.

The mesh segmentation results are very good and very close to the ground truth. From the performance point of view, sensitivity, specificity, accuracy and overlap ratio are close to one with values of 0.926619, 0.956931, 0.948829, 0.946594 and 0.958770 respectively. The last method gives the best results and this segmentation is close to the desired segmentation.

The performance of the algorithms implemented according to embodiments of the disclosure was evaluated by calculating the sensitivity, specificity, accuracy, and overlap ratio. These quantities are defined in terms of true positive $T_p$, true negative $T_n$, false positive $F_p$, and false negative $F_n$, as follows:

$$\text{Sensitivity} = \frac{T_p}{T_p + F_n};$$

$$\text{Specificity} = \frac{T_n}{T_n + F_p};$$

$$\text{Accuracy} = \frac{T_p + T_n}{T_p + T_n + F_n + F_p}; \text{ and}$$

$$\text{OverlapRatio} = \frac{2T_p}{2T_p + F_n + F_p}.$$

The statistical results for the segmentations are presented in Table 1 of FIG. 10.

As disclosed above, the weights of each function that is used for the probability computations is dependent on certain parameters, in particular, a weight for a convex edge and a weight for a concave edge. Previously, these parameters are set manually. According to an embodiment of the disclosure, the parameters may be estimated as coefficients of a regression model y=a×x, where a is the desired parameter, x is a feature vector of observations as described above and y is a vector of the results. A prior ground truth manual segmentation can be used to determine the y vector values. The choice of a regression model depends on the underlying shaping function. For a Gaussian shaping function, the regression model can be transformed into a quadratic system. However, for other shaping functions, such simplification may not be possible. The statistical results for parameter estimations are presented in Table 2 of FIG. 11.

The parameter estimation for three methods give good results. According to embodiments of the disclosure, the methods were interactive mesh constrained random walks, easy mesh cutting, and robust interactive mesh cutting using fast geodesic curvature flow. For the first method, the estimated parameters were 0.2454, 0.4669. The second method had a better specificity and the third method had a higher sensitivity.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 9:
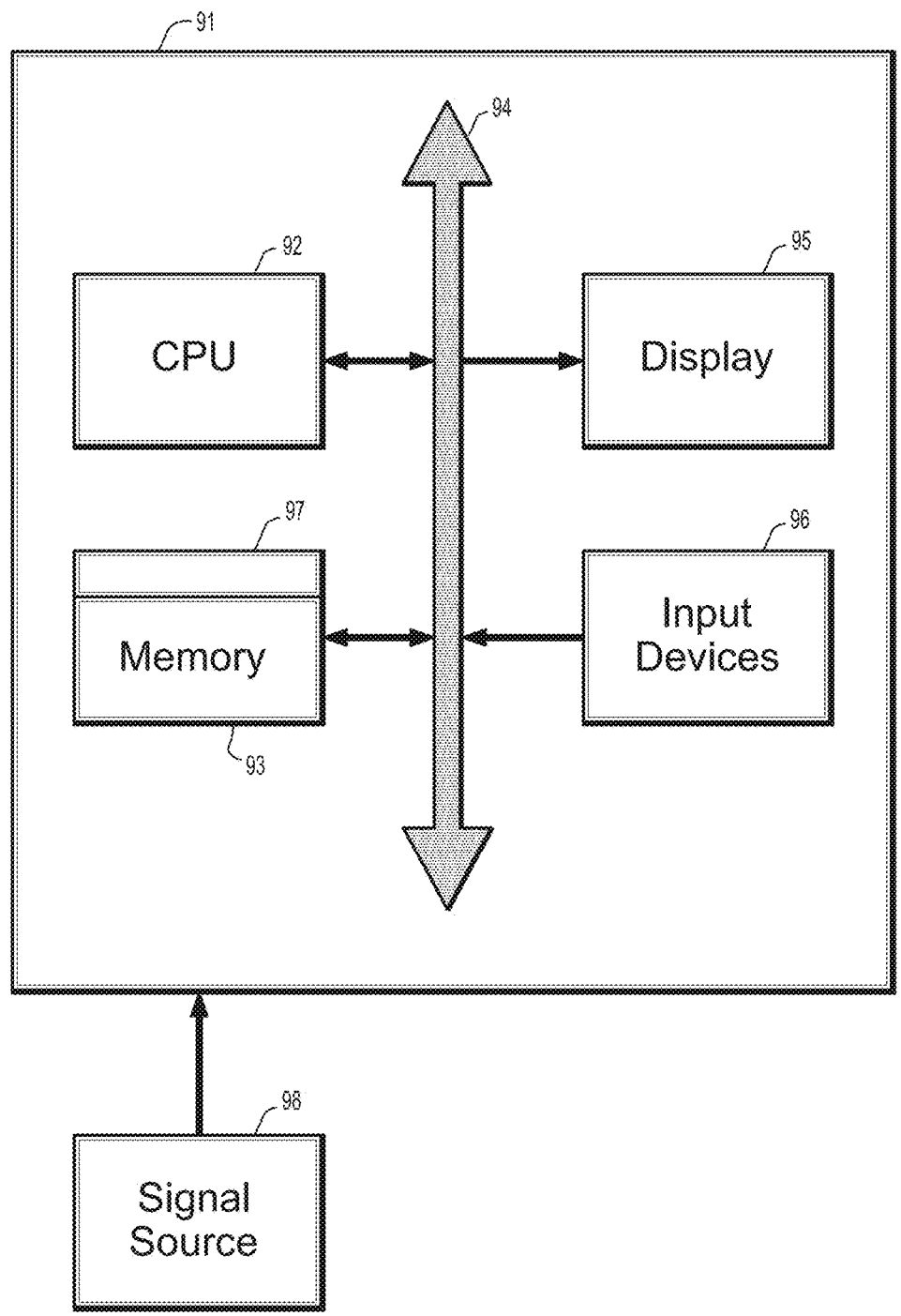
FIG. 9 is a block diagram of an exemplary computer system for implementing a method and system for estimating parameters for mesh segmentation using random walks, according to an embodiment of the disclosure.

FIG. 9 is a block diagram of an exemplary computer system for implementing a a method and system for estimating parameters for mesh segmentation using random walks according to an embodiment of the invention. Referring now to FIG. 9, a computer system 91 for implementing the present invention can comprise, inter alia, a central processing unit (CPU) 92, a memory 93 and an input/output (I/O) interface 94. The computer system 91 is generally coupled through the I/O interface 94 to a display 95 and various input devices 96 such as a mouse and a keyboard. The support circuits can include circuits such as cache, power supplies, clock circuits, and a communication bus. The memory 93 can include random access memory (RAM), read only memory (ROM), disk drive, tape drive, etc., or a combinations thereof. The present invention can be implemented as a routine 97 that is stored in memory 93 and executed by the CPU 92 to process the signal from the signal source 98. As such, the computer system 91 is a general purpose computer system that becomes a specific purpose computer system when executing the routine 97 of the present invention.

The computer system 91 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A method of segmenting mesh models in digital images, comprising the steps of:

in a mesh segmentation processor, receiving a mesh surface model (V, F, E) from a remote sensing system of a shape embedded in a 3-dimensional space, wherein the mesh surface model comprises vertices $V = v_i$, i=1, . . . , n, triangular/polygonal faces $F = f_i$, i=1, . . . , m, and edges $E = e_{ij} = (v, v_j) | v, v_j \in V, i \neq j$, where each edge connects two vertices;

providing to the mesh segmentation processor a ground truth segmentation of the mesh surface model;

using by the mesh segmentation processor said ground truth segmentation to determine weights $w_{ij}$ for edges $e_{ij}$ by solving $$\Sigma_i \Sigma_{j \in N_i} (v_i - v_j)^T H (v_i - v_j) = \begin{cases} -\ln \overset{\circ}{a} & \text{if } l_i \neq l_j, \\ 0 & \text{otherwise,} \end{cases}$$

wherein $v_i$ and $v_j$ are feature vectors corresponding to vertices $v_i$, $v_j$, H is a matrix of weights, $N_i$ is a neighborhood of vertices around $v_i$, $\epsilon \ll 1$ is a positive number, and $l_i$ and $l_j$ are segmentation labels of $f_i$ and $f_j$, wherein the weights $w_{ij}$ are the probabilities of a random walker crossing edges $e_{ij}$ between vertices $v_i$ and $v_j$ in a random walker segmentation initialized with at least two seeds of different labels.

2. The method of claim 1, further comprising constructing a feature vector $v_i$ composed of underlying geometric properties of the mesh at each vertex point.

3. The method of claim 2, wherein feature vectors include one or more of a dihedral angle, a mean curvature, a Gaussian curvature, a normal curvature, a global curvature geodesic flow, a principle curvature, a geodesic distance, an angular distance, and a volumetric shape image distance.

4. The method of claim 3, wherein the feature vector uses the dihedral angle between faces $f_i$, $f_j$, and the weights $w_{ij}$ are determined from $$w_{i,j} = |e_{i,j}| \exp(-d(f_i, f_j)/\sigma), \text{ wherein}$$

$$d(f_i, f_j) = d_1(f_i, f_j)/\bar{d}_1,$$

$$d_1(f_i, f_j) = n[1 - \cos(\text{dihedral}(f_i, f_j))] = \frac{n}{2} \| N_i - N_j \|, \bar{d}_1$$

is an average of $d_1(f_i, f_j)$ over all three faces adjacent to face $f_i$, $N_i$ and $N_j$ are the normal vectors of faces $f_i$, $f_j$, dihedral$(f_i, f_j)$ is the dihedral angle between normal vectors $N_i$ and $N_j$, and $\sigma$ is a predetermined constant that distinguishes between a convex edge and a concave edge.

5. The method of claim 4, wherein the feature vector uses the Gaussian curvature, and the mean curvature, and $$d(f_i, f_j) = n \times \max\left(\frac{d_1(f_i, f_j)}{\bar{d}_1}, \frac{d_2(f_i, f_j)}{\bar{d}_2}, \frac{d_3(f_i, f_j)}{\bar{d}_3}\right),$$

wherein $d_2(f_k, f_i) = |K(f_i) - K(f_k)|$, $d_3(f_k, f_i) = |H(f_i) - H(f_k)|$, K is the Gaussian curvature, H is the Mean curvature, $\bar{d}_1$, $\bar{d}_2$ and $\bar{d}_3$ are average values of the functions $d_1(f_i, f_j)$, $d_2(f_i, f_j)$, $d_3(f_i, f_j)$, respectively, and n is a normalization constant.

6. The method of claim 3, wherein the feature vector uses distance and normal curvature, and the weights $w_{ij}$ are determined from $$w_{ij} = \exp(-d_{ij}^2),$$

wherein $$d_{ij} = w_1 \|v_1 - v_j\| + w_2 \|n_i - n_j\| + w_3 f(k_{v_i v_j})$$

wherein $v_1$, $v_2$ are vertices at either end of edge $e_{ij}$, $n_i$ and $n_j$ are normal vectors at vertices $v_i$ and $v_j$, respectively, $k_{v_i v_j}$ is the average of normal curvature at $v_i$ along the line direction $v_i v_j$ and the normal direction along $v_j v_i$, wherein $$k_{v_i v_j} = \frac{k_{v_i v_j} + k_{v_j v_i}}{2}, \text{ and } f(k) = \begin{cases} k, & \text{if } k \geq 0, \\ n|k| & \text{if } k < 0, \end{cases}$$

wherein n is a predetermined constant that augments negative curvature, and $w_1$, $w_2$, $w_3$ are predetermined coefficients that control a relative importance of the distance, normal direction and curvature.

7. The method of claim 3, wherein the feature vector uses a distance between vertices and a difference between normals of the vertices, and the weights $w_{ij}$ of edge $e_{ij}$ are determined from $$w_{ij} = \exp(-d_{ij} \bar{d}),$$

wherein $d_{ij} = n \|v_i - v_j\| \times \|N(v_i) - N(v_j)\|$, $\|v_i - v_j\|$ is a Euclidean distance between the vertices $v_i$, $v_j$, and $N(v_i)$ and $N(v_j)$ are the normals at vertices $v_i$, $v_j$ respectively, n is a predetermined constant that augments concavity of the edge $e_{ij}$, and $\bar{d}$ is the average value of $\bar{d}_{ij}$ over the mesh surface model.

8. The method of claim 3, wherein the feature vector a distance between vertices, a difference between normals of the vertices, and normal curvature, and the weights $w_{ij}$ of edge $e_{ij}$ are determined from $$w_{ij} = |p_i - p_j| + w \times |n_i - n_j| + w^* \times f(k_{p_i p_j}),$$

wherein $p_i$, $p_j$ are adjacent vertices, $n_i$, $n_j$ are the normals of $p_i$, $p_j$ respectively, $k_{p_i p_j}$ is the directional curvature along the line $p_i p_j$, w and w* are predetermined constants, and f is a curvature function defined as $$f(k_D) = \begin{cases} k_D & \text{if } k_D \geq 0, \\ g(k_D) & \text{if } k_D < 0, \end{cases}$$

where g is an augmentation function that augments an effect of negative curvature.

9. The method of claim 8, wherein a vertex normal is an average of face normals of faces that surround the vertex.

10. The method of claim 2, wherein extracting features further comprises:
determining a geodesic distance of each vertex on each ring of a plurality of rings about a center vertex, where an $i^{th}$ ring around a vertex $v_0$ is a set of vertices v in the mesh model wherein there exists a shortest path from $v_0$ to v containing i edges;
computing an average curvature within each ring;
weighting the geodesic distance of each vertex by the average ring curvature; and
forming a feature vector from the geodesic distances of each vertex.

11. A method of segmenting mesh models in digital images, comprising the steps of:
in a mesh segmentation processor, receiving a mesh surface model (V, F, E) from a remote sensing system of a shape embedded in a 3-dimensional space, wherein the mesh surface model comprises vertices $V = v_i$, $i = 1, \ldots, n$, triangular/polygonal faces $F = f_i$, $i = 1, \ldots, m$, and edges $E = e_{ij} = (v_i, v_j) | v_i, v_j \in V, i \neq j$, where each edge connects two vertices;
extracting by the mesh segmentation processor a feature vector $v_i$ at each vertex on the mesh surface model;
using by the mesh segmentation processor the feature vector to determine weights $w_{ij}$ for edges $e_{ij}$ by solving $$\Sigma_i \Sigma_{j \in N_i} (v_i - v_j)^T H (v_i - v_j) = \begin{cases} -\ln \overset{\circ}{a} & \text{if } l_i \neq l_j, \\ 0 & \text{otherwise,} \end{cases}$$

wherein $v_i$ and $v_j$ are feature vectors corresponding to vertices $v_i$, $v_j$, H is a matrix of weights, $N_i$ is a neighborhood of vertices around $v_i$, $\epsilon \ll 1$ is a positive number, and $l_i$ and $l_j$ are segmentation labels of $v_i$ and $v_j$,
wherein the weights $w_{ij}$ are the probabilities of a random walker crossing edges $e_{ij}$ between vertices $v_i$ and $v_j$ in a random walker segmentation initialized with at least two seeds.

12. The method of claim 1, further comprising providing a ground truth segmentation of the mesh surface model, wherein the ground truth segmentation provides the segmentation labels $l_i$ and $l_j$.

13. A non-transitory program storage device readable by a computer, tangibly embodying a program of instructions executed by the computer to perform the method steps for segmenting mesh models in digital images, the method comprising the steps of:

in a mesh segmentation processor, receiving a mesh surface model (V, F, E) of a shape embedded in a 3-dimensional space, wherein the mesh surface model comprises vertices $V=v_i$, $i=1, \ldots, n$, triangular/polygonal faces $F=f_i$, $i=1, \ldots, m$, and edges $E=e_{ij}=(v_i,v_j)|v_i,v_j \in V, i \neq j$, where each edge connects two vertices;

in the mesh segmentation processor, receiving a ground truth segmentation of the mesh surface model;

using by the mesh segmentation processor, said ground truth segmentation to determine weights $w_{ij}$ for edges $e_{ij}$ by solving $$\Sigma_i \Sigma_{j \in N_i} (v_i - v_j)^T H (v_i - v_j) = \begin{cases} -\ln \overset{\circ}{a} & \text{if } l_i \neq l_j, \\ 0 & \text{otherwise,} \end{cases}$$

wherein $v_i$ and $v_j$ are feature vectors corresponding to vertices $v_i$, $v_j$, H is a matrix of weights, $N_i$ is a neighborhood of vertices around $v_i$, $\epsilon \ll 1$ is a positive number, and $l_i$ and $l_j$ are segmentation labels of $f_i$ and $f_j$, wherein the weights $w_{ij}$ are the probabilities of a random walker crossing edges $e_{ij}$ between vertices $v_i$ and $v_j$ in a random walker segmentation initialized with at least two seeds of different labels.

14. The computer readable program storage device of claim 13, the method further comprising constructing a feature vector $v_i$ composed of underlying geometric properties of the mesh at each vertex point.

15. The computer readable program storage device of claim 14, wherein feature vectors include one or more of a dihedral angle, a mean curvature, a Gaussian curvature, a normal curvature, a global curvature geodesic flow, a principle curvature, a geodesic distance, an angular distance, and a volumetric shape image distance.

16. The computer readable program storage device of claim 15, wherein the feature vector uses the dihedral angle between faces $f_i$, $f_j$, and the weights $w_{ij}$ are determined from $$w_{i,j} = |e_{i,j}| \exp(-d(f_i, f_j)/\sigma), \text{ wherein}$$

$$d(f_i, f_j) = d_1(f_i, f_j)/\overline{d}_1,$$

$$d_1(f_i, f_j) = n[1 - \cos(\text{dihedral}(f_i, f_j))] = \frac{n}{2} \|N_i - N_j\|, \overline{d}_1$$

average of $d_1(f_i, f_j)$ over all three faces adjacent to face $f_i$, $N_i$ and $N_j$ are the normal vectors of faces $f_i$, $f_j$, dihedral$(f_i, f_j)$ is the dihedral angle between normal vectors $N_i$ and $N_j$, and $\sigma$ is a predetermined constant that distinguishes between a convex edge and a concave edge.

17. The computer readable program storage device of claim 16, wherein the feature vector uses the Gaussian curvature, and the mean curvature, and $$d(f_i, f_j) = n \times \max\left(\frac{d_1(f_i, f_j)}{\overline{d}_1}, \frac{d_2(f_i, f_j)}{\overline{d}_2}, \frac{d_3(f_i, f_j)}{\overline{d}_3}\right),$$

wherein $d_2(f_k, f_i)=|K(f_i)-K(f_k)|$, $d_3(f_k, f_i)=|H(f_i)-H(f_k)|$, K is the Gaussian curvature, H is the Mean curvature, $\overline{d}_1$, $\overline{d}_2$ and $\overline{d}_3$ are average values of the functions $d_1(f_i, f_j)$, $d_2(f_i, f_j)$, $d_3(f_i, f_j)$, respectively, and n is a normalization constant.

18. The computer readable program storage device of claim 15, wherein the feature vector uses distance and normal curvature, and the weights $w_{ij}$ are determined from $$w_{ij} = \exp(-d_{ij}^2),$$

wherein $$d_{ij} = w_1 \|v_i - v_j\| + w_2 \|n_i - n_j\| + w_3 f(k_{v_i v_j})$$

wherein $v_1$, $v_2$ are vertices at either end of edge $e_{ij}$, $n_i$ and $n_j$ are normal vectors at vertices $v_i$ and $v_j$, respectively, $k_{v_i v_j}$ is the average of normal curvature at $v_i$ along the line direction $v_i v_j$ and the normal direction along $v_j v_i$, wherein $$k_{v_i v_j} = \frac{k_{v_i v_j} + k_{v_j v_i}}{2}, \text{ and } f(k) = \begin{cases} k, & \text{if } k \geq 0, \\ n|k| & \text{if } k < 0, \end{cases}$$

wherein n is a predetermined constant that augments negative curvature, and $w_1$, $w_2$, $w_3$ are predetermined coefficients that control a relative importance of the distance, normal direction and curvature.

19. The computer readable program storage device of claim 15, wherein the feature vector uses a distance between vertices and a difference between normals of the vertices, and the weights $w_{ij}$ of edge $e_{ij}$ are determined from $$w_{ij} = \exp(-d_{ij}/\overline{d}),$$

wherein $d_{ij} = n \|v_i - v_j\| \times \|N(v_i) - N(v_j)\|$, $\|v_i - v_j\|$ is a Euclidean distance between the vertices $v_i$, $v_j$, and $N(v_i)$ and $N(v_j)$ are the normals at vertices $v_i$, $v_j$ respectively, n is a predetermined constant that augments concavity of the edge $e_{ij}$, and $\overline{d}$ is the average value of $d_{ij}$ over the mesh surface model.

20. The computer readable program storage device of claim 15, wherein the feature vector a distance between vertices, a difference between normals of the vertices, and normal curvature, and the weights $w_{ij}$ of edge $e_{ij}$ are determined from $$w_{ij} = |p_i - p_j| + w \times |n_i - n_j| + w^* \times f(k_{p_i p_j}),$$

wherein $p_i$, $p_j$ are adjacent vertices, $n_i$, $n_j$ are the normals of $p_i$, $p_j$ respectively, $k_{p_i p_j}$ is the directional curvature along the line $p_i p_j$, w and $w^*$ are predetermined constants, and f is a curvature function defined as $$f(k_D) = \begin{cases} k_D & \text{if } k_D \geq 0, \\ g(k_D) & \text{if } k_D < 0, \end{cases}$$

where g is an augmentation function that augments an effect of negative curvature.

21. The computer readable program storage device of claim 20, wherein a vertex normal is an average of face normals of faces that surround the vertex.

22. The computer readable program storage device of claim 14, wherein extracting features further comprises:

determining a geodesic distance of each vertex on each ring of a plurality of rings about a center vertex, where an $i^{th}$ ring around a vertex $v_0$ is a set of vertices v in the mesh model wherein there exists a shortest path from $v_0$ to v containing i edges;
computing an average curvature within each ring;
weighting the geodesic distance of each vertex by the average ring curvature; and
forming a feature vector from the geodesic distances of each vertex.

* * * * *